United States Patent
Slavchev

(10) Patent No.: US 6,534,881 B1
(45) Date of Patent: Mar. 18, 2003

(54) WATERWHEEL POWER GENERATING DEVICE

(76) Inventor: Slavcho Slavchev, 1201, 17th St., Apt. 103, Miami Beach, FL (US) 33139

( * ) Notice: Subject to any disclaimer, the term of this patent is extended or adjusted under 35 U.S.C. 154(b) by 0 days.

(21) Appl. No.: 09/865,996

(22) Filed: May 25, 2001

(51) Int. Cl.[7] .................................................. F03B 13/00
(52) U.S. Cl. .......................................... 290/54; 290/53
(58) Field of Search .............................. 290/54, 53, 42, 290/43

(56) References Cited

U.S. PATENT DOCUMENTS

| | | | |
|---|---|---|---|
| 4,001,596 A | 1/1977 | Kurtzbein | .................... 290/53 |
| 5,440,175 A | * 8/1995 | Mayo, Jr. et al. | ............. 209/54 |
| 6,208,037 B1 | * 5/2002 | Mayo, Jr. et al. | ............. 290/54 |

* cited by examiner

Primary Examiner—Nestor Ramirez
Assistant Examiner—Leda Pham
(74) Attorney, Agent, or Firm—J. Sanchelima; A. Bordas

(57) ABSTRACT

A waterwheel apparatus designed to generate power. The waterwheel is set below the surface of a body of water. The waterwheel has air chambers that inflate and deflate. The air chambers within the wheel have air valves. Air is introduced into specific chambers when desired to cause a buoyancy effect and cause a particular area of the wheel to travel in the direction of the water surface. Introducing air at specific angular positions to the air chambers cause the wheel to rotate under water. The energy derived from this motion and connected to pulley and gear mechanisms supply power.

9 Claims, 5 Drawing Sheets

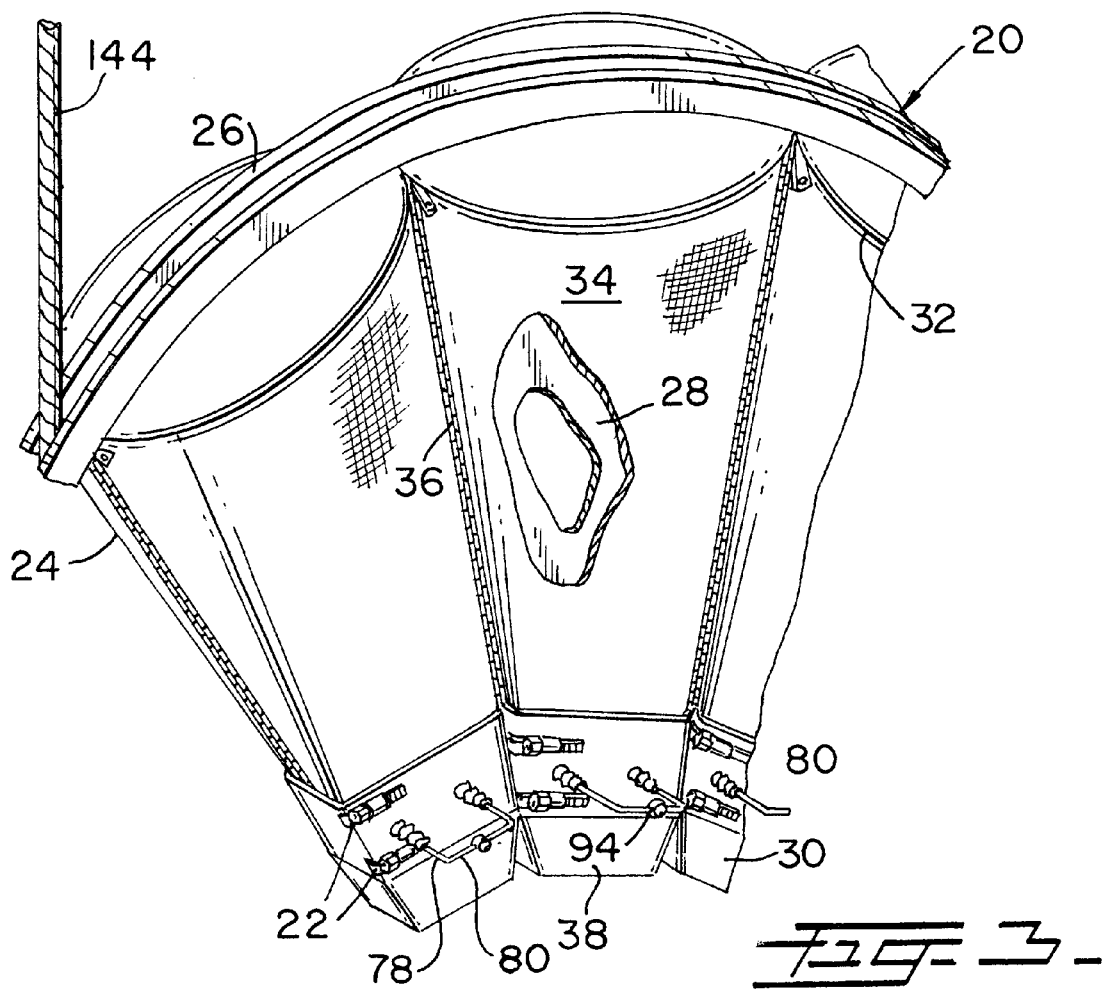

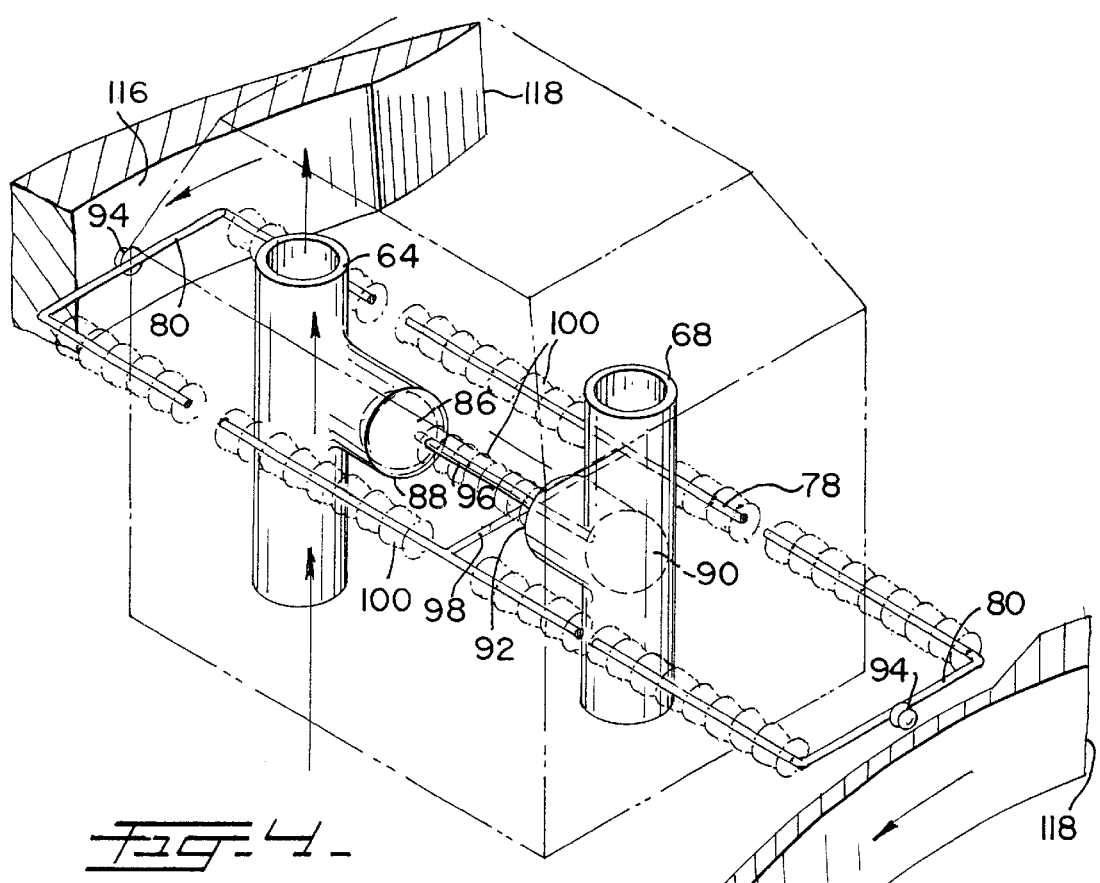
Fig-4-
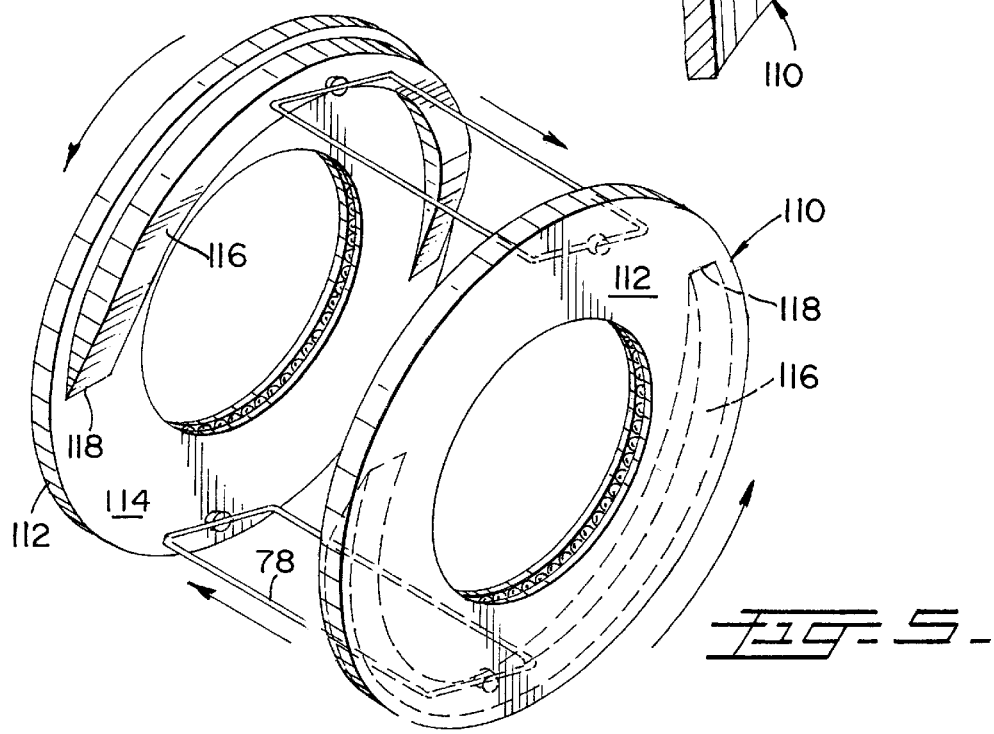
Fig-5-

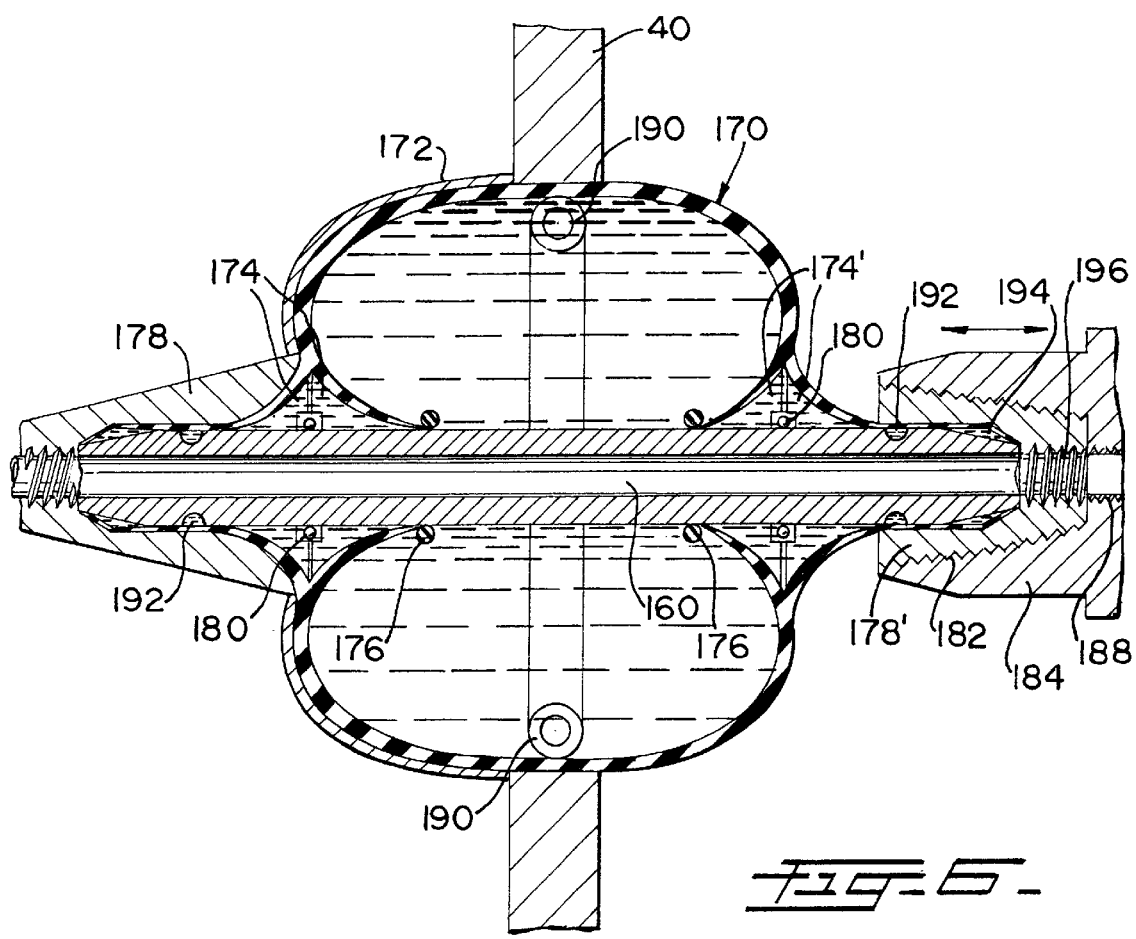

WATERWHEEL POWER GENERATING DEVICE

BACKGROUND OF THE INVENTION

1. Field of the Invention

The present invention relates to a waterwheel plant, and more particularly, to an underwater wheel with inflating and deflating air chambers that operate at predetermined angular degrees, establishing a rotational wheel motion in a clockwise or counterclockwise direction.

2. Description of the Related Art

Many designs for waterwheel plants have been designed in the past. None of them however, include a wheel apparatus submerged in a body of water that rotates in a clockwise or counterclockwise direction, where such motion produces power.

Applicant believes that the closest reference corresponds to U.S. Pat. No. 5,440,175 issued to Mayo, Jr. et al. However, it differs from the present invention because Mayo's prior art teaches an electric generator assembly driven by a waterwheel wherein the axial length of the waterwheel is substantially greater than the diameter thereof and contains a speed-increasing device for driving a high speed generator. The waterwheel has longitudinal buckets designed to develop maximum energy over a wide range of flow of water and also discharge debris. U.S. Pat. No. 4,001,596 issued to Kurtzbein also differs from the present invention. Kurtzbein teaches a pair of hull portions connected in a spaced parallel relation supporting a water wheel and form a passageway therebetween for a driving engagement of flowing water against the vanes of the water wheel.

Other patents describing the closest subject matter provide for a number of more or less complicated features that fail to solve the problem in an efficient and economical way. None of these patents suggest the novel features of the present invention.

SUMMARY OF THE INVENTION

The instant invention is an underwater wheel having air chambers. Air is introduced into specific air chambers at predetermined angular degrees to establish a buoyancy effect that causes a particular area of the waterwheel to travel while underwater in the direction of the water surface. During rotation of the wheel assembly, half of the primary air valves are open and half of the secondary valves are closed. Rotational speed will depend on the specifications of a pneumatic system. Greater rotational speed will be achieved with the utilization of air valves and pumps designed for such requirements. The wheel assembly may be designed to rotate in either a clockwise or counter-clockwise direction. In the preferred embodiment, assuming a counter-clockwise wheel rotation, the air chambers begin to inflate at approximately 175 degrees and begin to deflate at approximately 5 degrees. Assuming a clockwise rotation, the air chambers begin to inflate at approximately 185 degrees and begin to deflate at approximately 355 degrees. The energy derived from this motion produce power which may be utilized or stored as desired.

The underwater power-generating device has a wheel assembly having an inside diameter surface and an outside track connected by a plurality of spokes, said spokes having flexible air chambers fixedly secured thereon. A hub assembly is fixedly secure through said wheel assembly and has a first and second retaining ring mounted, whereas said wheel assembly is positioned between said first and second retaining rings. The hub assembly further has first and second channels and pneumatic means to inflate and deflate said air chambers. The underwater power-generating device further has track assemblies, each having first and second faces, whereas each first face has a semicircular rail mounted thereon, forming an approximate circle when said semicircular rails face each other. The wheel assembly rotates between said semicircular rails and said first and second track assemblies complement said first and second channels, allowing said hub to rotate upon said first and second track assemblies. The instant invention also has a support structure including hoisting means to raise and lower said underwater power generating device and anchor means to secure said support structure. Said anchor means having a predetermined cooperative length and attached to the bottom of a body of water so that said anchor means stabilizes said underwater power generating device while in operation and while hoisting means is activated.

The flexible air chambers include valve frames. The pneumatic means further includes said hub assembly having a primary and secondary air tank and said air chambers having primary and secondary air valves. The primary air valve opens when one end is biased against said semicircular rail of said first track assembly. This allows pressurized air to exit from said primary tank through said primary valve to inflate the air chamber. The secondary air valve opens when the other end is biased against said semicircular rail of said second track assembly. This allows air to escape through said secondary air valve into said secondary air tank. The secondary tank having electrical pump means to pump air from said secondary air tank to said primary air tank.

The pneumatic means further include a water seal with sealing means to prevent the entry of water. The underwater power-generating device has an outside track, which is a pulley. The flexible air chambers are enclosed in housing means, whereas said housing means includes attachment means to fastenly secure to said spokes.

A plurality of apparatus as the instant invention may form a group in a body of water to supply large quantities of power and the body of water must be one that is sufficiently deep to operate said underwater power generating device.

It is therefore one of the main objects of the present invention to provide a waterwheel power generating plant that is environmentally friendly.

It is another object of this invention to provide a waterwheel power generating plant that may be utilized in any body of water.

It is another object of this invention to provide a waterwheel power generating plant that may be suspended from bridges, barges, pontoons, or any similar structure designed over water.

It is still another object of the present invention to provide a waterwheel power generating plant having a waterwheel completely submerged in water.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combi

FIG. 3 is an isometric view of a section of the wheel assembly.

FIG. 4 is an isometric view of the air valves and a portion of the track assembly.

FIG. 5 is an isometric view of the valve frames and track assembly.

FIG. 6 is a cut view of the electrical cord water seal.

DETAILED DESCRIPTION OF THE PREFERRED EMBODIMENT

Figure 1:
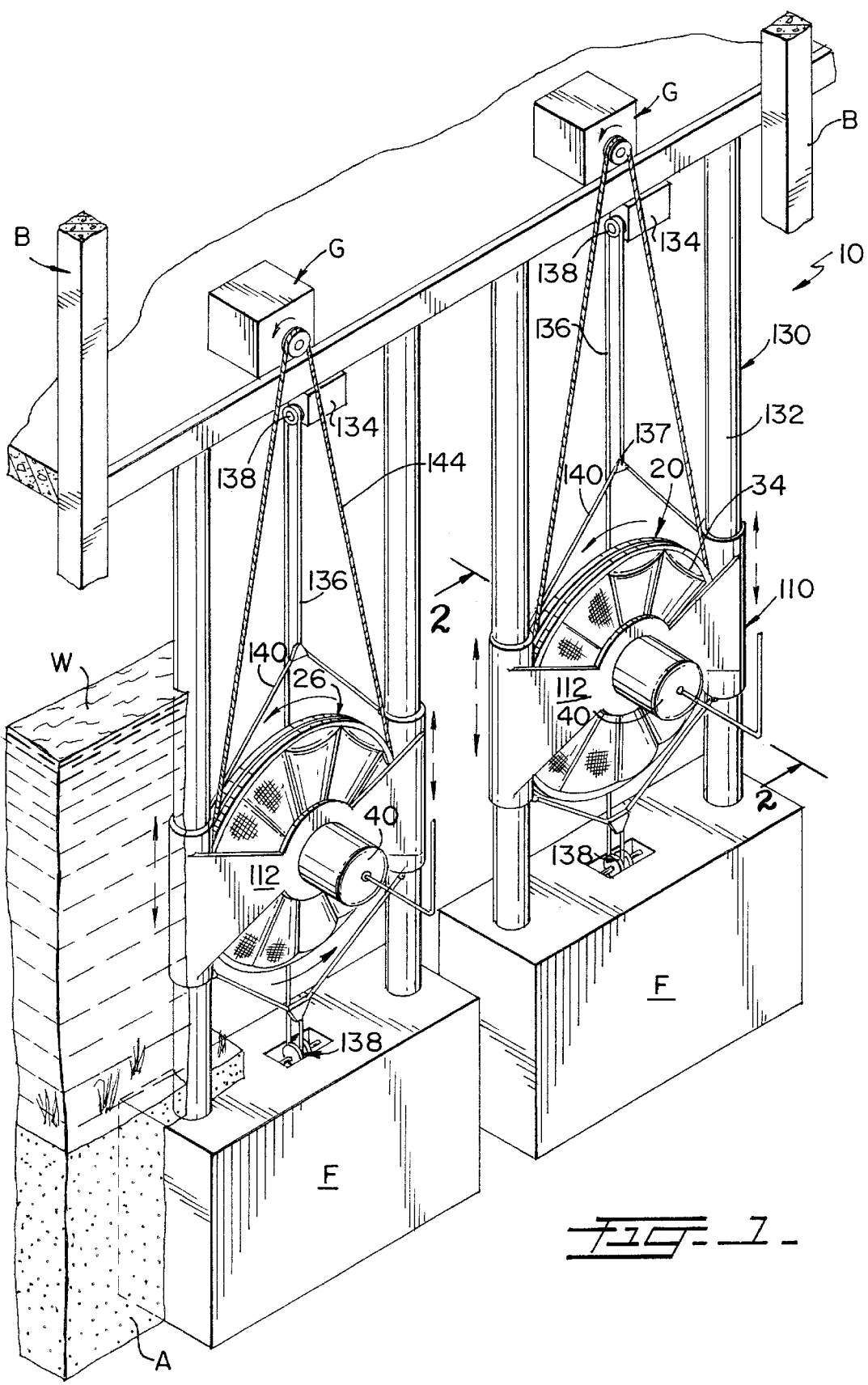
- FIG. 1 represents a perspective view of the instant invention suspended from a bridge over a body of water.

Referring now to the drawings, where the present invention is generally referred to with numeral 10, it can be observed that it basically includes wheel assembly 20, hub assembly 40, track assembly 110, and support structure 130.

As seen in FIG. 1, instant invention 10 is operated in body of water W. In the preferred embodiment, instant invention 10 may be suspended from bridge B. Bridge B and foundation F provide stability for wheel assembly 20, together with hub assembly 40 to rotate while track assembly 110 remains stationary.

Wheel assembly 20 operates in a vertical position and may be lowered into or out of body of water W. Lowering or raising wheel assembly 20 is possible with support structure 130. Shafts 132 extend from foundation F to bridge B for stability. In the preferred embodiment, winch 134, cables 136 and pulley assemblies 138 are utilized to lower and raise wheel assembly 20 in the body of water. Winch 134, in this embodiment suspended from bridge B, in cooperation with pulley assemblies 138, drive cable 136. Cable 136 is attached to connector 137. Track assemblies 110 are secured to support structure 130. Extending from connector 137 are cables 140 that are attached at predetermined areas of track assembly 110. Cables 140 help stabilize while in operation and reduce overall vibration. Further stabilization may result with anchoring devices A placed at the surface of the water and the floor of the body of water if feasible.

In operation, wheel assembly 20 rotates in a counter-clockwise or clockwise direction. Wheel assembly 20 has outside track 26, which serves as a pulley. Cable 144 rides on outside track 26 and a pulley mechanism, of generator G.

Figure 2:
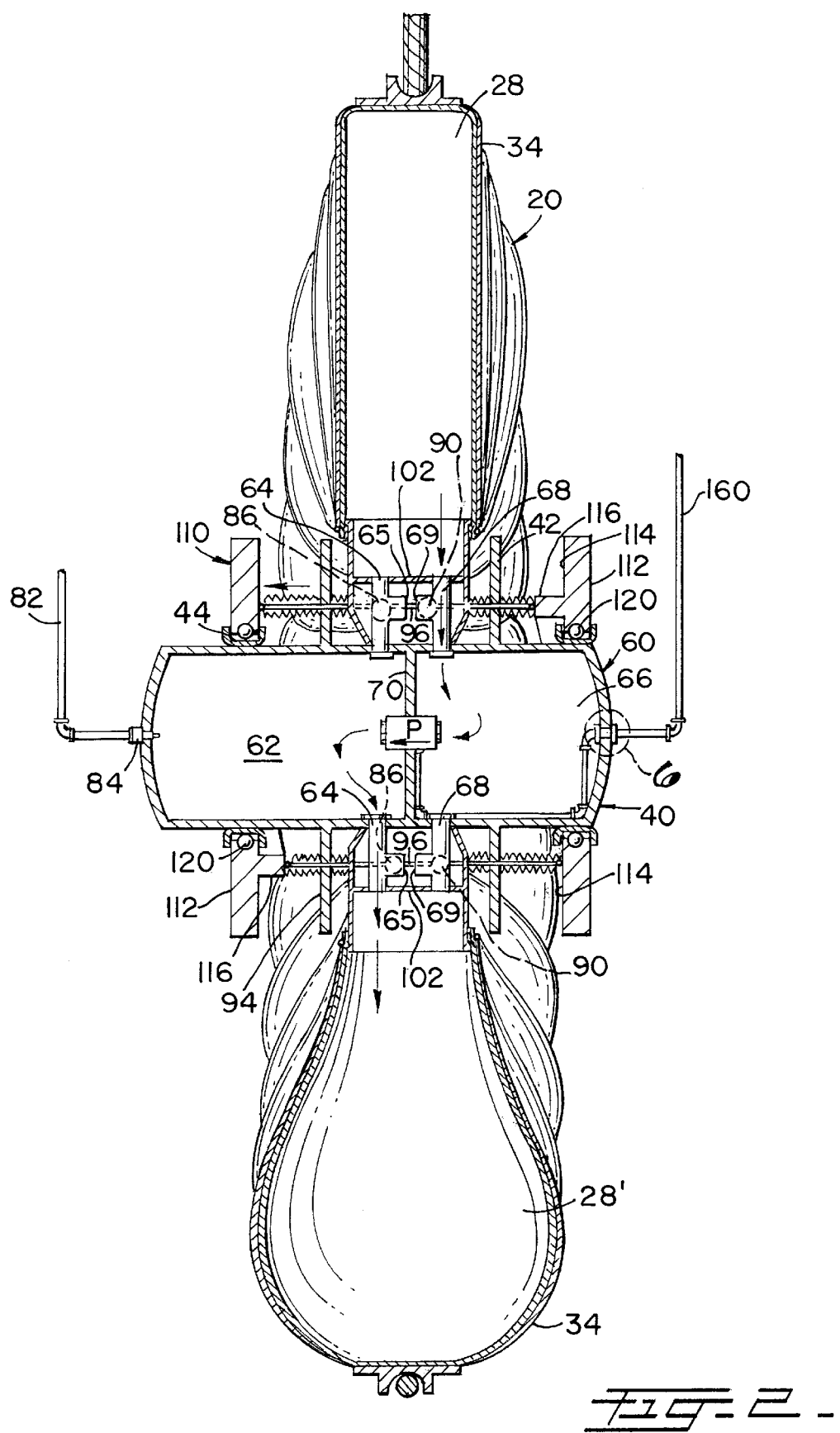
FIG. 2 illustrates a view of the pneumatic system taken along line 2—2 of FIG. 1.

As seen in FIG. 2, hub assembly 40 is at the center of wheel assembly 20 and contains pneumatic system 60. Pneumatic system 60 primarily includes high-pressure, primary tank 62, and low-pressure, secondary tank 66 separated by wall 70. While operating, primary tank 62 has a predetermined amount of pressure. Air within pneumatic system 60 cycles in a closed loop. Air transfers from primary tank 62 through primary valve 64 to inflate air chamber 28', and then air chamber 28' deflates and becomes air chamber 28 as air transfers through secondary valve 68 to secondary tank 66. From secondary tank 66, air is transported back into primary tank 62 with air pump P. Air pump P may be located at wall 70. Air pump P has a one-way valve, not seen, to prevent pressurized air from flowing from back to secondary tank 66 from primary tank 62.

As shown in FIG. 2, air chamber 28' represents an inflated air chamber whereas ball 86 is biased against slot 65, thus allowing air to flow through primary valve 64. Ball 86 is interconnected to ball 90 by connector 96. While ball 86 is biased against slot 65, ball 90 blocks the airflow of secondary valve 68. Air chamber 28 represents a deflated air chamber whereas ball 90 is biased against slot 69, thus allowing air to flow through secondary valve 68. Ball 86 is interconnected to ball 90 by connector 96. Therefore, while ball 90 is biased against slot 69, ball 86 blocks the airflow of primary valve 64. Plate 102 serves to stabilize and is at the distal end of primary valve 64 and secondary valve 68. External air hose 82 connects to connector 84 to fill primary tank 62 with air. External air hose 82 is disconnected once primary air tank 62 is full and is disconnected before instant invention 10 begins to rotate.

As previously mentioned, wheel assembly 20 rotates with hub assembly 40. Track assembly 110 has channel 44. Bearings 120 ride within channel 44 to facilitate rotation.

Perpendicularly extending from hub assembly 40, are retaining rings 42 securely fastened at either side of wheel assembly 20. Retaining rings 42 stabilize valve frame 78, seen in FIG. 3. Outside of retaining rings 42, are channels 44. Wheel assembly 20 is fixedly secured to hub assembly 40, and hub assembly rotates within track assembly 110. For rotational facilitation and stability of hub assembly 40, track assembly 110 has wheels 120 that travel within channel 44. Wheels 120 may travel in either direction. In an alternate embodiment, wheels 120 may be bearings or any other system designed to reduce friction and allow easy movement of hub assembly 40 within track assembly 110.

As best seen in FIG. 3, wheel assembly 20 has outside track 26 as a perimeter ring. Perpendicularly extending from track 26 at predetermined distances from each other, spokes 24 connect to hub assembly 40. Housings 34 connect to spokes 24 and are attached at each side along the length of spokes 24 with zippers 36 removably secured. In the preferred embodiment, housings 34 are flexible to expand and contract with air chamber 28 and are made of corrosion resistant properties. Air chambers 28 are generally flat in a deflated state and cone shaped. Shaped to complement air chambers 28, housings 34 cover and provide support for air chambers 28. This allows water to flow over housings 34 so as to protect air chambers 28 and provide for minimal water resistance. Perpendicularly protruding from hub assembly 40 are sleeves 38. Sleeves 38 tightly mount over base 30 of housings 34 and are secured with clamps 22. Valve frame 78 partially protrudes from housing 34 and clamp 22. Valve frame 78 slides within housing 34 in a side to side motion as bearing 94 makes contact with semicircular rail 116, seen in FIG. 4. The buoyancy force established within air chamber 28 is proportionate to the size of air chamber 28, therefore, the greater the volumetric size of air chamber 28, the greater the buoyancy force established within.

As seen in FIG. 4, valve frame 78 is generally rectangular. However it may be of various shapes not limited to elliptical, elongated octagon or the like. Valve frame 78 primarily has ends 80, connectors 96 and 98, and balls 86 and 90. The ends of valve frame 78 are exposed to water and valve frame 78 is activated upon rotation of wheel assembly 20, seen in FIG. 1. Activation occurs when contact is made between bearing 94 of frame end 80 and semicircular rail 116 of track assembly 110. Air valves 64 and 68 open and close as balls 86 and 90 shift therein. Seal 100 may be a harmonic type to allow valve frame 78 to slide while preventing the entry of water.

As seen in FIG. 5, track assemblies 110 are on either side of wheel assembly 20, seen in FIG. 1, with semicircular rails 116 facing each other. Semicircular rail 116 is a track in the shape of the perimeter of a half circle, whereas when both semicircular rails 116 face each other, their tracks form a complete circle. Ends 118 of semicircular rail 116 taper towards internal face 114 of track assembly 110. Valve frame 78 shifts when bearings 94 of frame ends 80 make contact with semicircular rail 116, thus activating primary air valve 64 and secondary air valve 68, seen in FIG. 2.

As valve frame 78 slides in a side to side motion, valves 64 and 68 open and close. For each respective air chamber 28, while primary valve 64 is in the open position, secondary valve 68 will be in the closed position, and vice-versa.

As seen in FIG. 6, extending from hub assembly 40 is shaft 160, which houses the electrical connection of the instant invention. Shaft 160 is stationary and extends to its source.

The connection point to hub assembly 40 should be watertight to prevent water from entering hub assembly 40. In the preferred embodiment, shaft 160 snugly fits within seal 170. Seal 170 utilizes Gallium for sealing, since it is of a higher density than water, 6.1 times greater. The Gallium element is utilized because of its low melting temperature properties. Another element that may be utilized is Cs or others with similar properties. Seal 170 is flexible whereas the exterior side exposed to water is flexible to allow for expansion and contraction. Container 172 stores the Gallium and is connected at either side by containers 174 and 174'. Containers 174 and 174' are filled with oil and have orifices to allow for the free-flow of oil through a wall in each. Containers 174 and 174' act as bearings, due to their lubrication and connect to retaining rings 176, which snugly fit on shaft 160. Containers 174 and 174' rotate on shaft 160. Retaining rings 176 also keep oil from spreading into container 172. Interior cones 178 and 178' complement the shape and snugly fit over containers 174 and 174' respectively. Shaft 160 has grooves 192 with mercury within to maintain oil within containers 174; 174' and pockets 194. Interior cone 178 and 178' screws into place with treading 196 to secure containers 174 and 174' respectively, providing a watertight seal. Interior cone 178 serves to contain container 174 and does not expand and exterior cone 184 secures interior cone 178'. Tread 182 is mounted on interior cone 178' to cooperatively match the treading of exterior cone 184. Tread 182 allows for the pressure adjustment of water seal 170, whereas tightening exterior cone 184 onto interior cone 178' increases the pressure within water seal 170. This is necessary because as the water depth increases, the pressure required for water seal 170 increases as well. Interior cones 178 and 178' act as bearings for containers 174 and 174' respectively. Additionally, exterior cone 184 rotates on shaft 160 but interior cone 178' does not. Interior cone 178' does however slide upon shaft 160. Bearings 180 keep seal 170 secure and rotate about shaft 160. Exterior cone 184 screws onto interior cone 178' to fastenly secure. A rear plate, not seen, is welded to a shaft that covers shaft 160 for additional support. Harmonic seal 188 connects the rear plate welded to the shaft, not seen, to interior cone 178'. For lubrication, oil displaces friction between shaft 160 and container 172. Heating element 190 may be used if necessary to keep the Gallium in a liquid state.

This results in a watertight system to allow shaft 160 to connect to hub assembly 40 without water entering. Gallium provides the additional seal. Oil, such as hydraulic or the equivalent, inside containers 174 and 174' are under a pressure of one to two atmospheres. With this pressure, water is adequately displaced. Upon rotation of wheel assembly 20, heat is created from the friction between the rotating shaft, and seal 170. Due to the raise in temperature, Gallium will liquefy. To keep Gallium in a liquid form when wheel assembly 20 is not operating, or when cold water temperatures exist, heating element 190 is required. In an alternate embodiment, water seal 170 may be utilized with connector 84.

As the external water pressure increases, the greater the seal established between seal 170 and shaft 160.

To lower wheel assembly 20 into body of water and begin operation, air chambers 28 are empty and air pump P is turned off. Wheel assembly 20 is lowered into a body of water to a predetermined depth. Upon reaching the predetermined depth, air is pumped into primary tank 62 through external air hose 82. External air hose 82 connects to connector 84 of hub assembly 40. Since there are two semicircular rails 116 in the preferred embodiment, one on each side of wheel assembly 20 that keep half of the air valves closed and the other half open, the air from external air hose 82 will start inflating half of air chambers 28 together with primary tank 62. In one embodiment, generator G may incorporate a brake system to hold wheel assembly 20 stationary while the initial inflating process is occurring. When initial inflating is complete, primary tank 62 and the selected air chambers 28 are full to their capacity, external air hose 82 is removed from connector 84. Air pump P is then turned on; the brake system is released and wheel assembly 20 beings rotation. Air pressure inside instant invention 10 is always higher than the surrounding underwater pressure to allow air chambers 28 to inflate as required.

In alternate embodiments however, instant invention 10 may be suspended from a pontoon or any similar object designed to float, suspend or otherwise provide.

Instant invention 10 does not utilize a cooling system. The exterior water temperature maintains operational temperatures to remain constant for the needs of the equipment. In an alternate power requirement setting, a timer may be utilized to operate instant invention 10.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An underwater power generating device, comprising:
   A) a wheel assembly having an inside diameter surface and an outside track connected by a plurality of spokes, said spokes having flexible air chambers fixedly secured thereon, each of said spokes having first and second ends, said first ends secured to said inside diameter surface, and said second ends secured to said outside track, said air chambers containing air valves;
   B) a hub assembly having third and fourth ends, said hub assembly is fixedly secure through said wheel assembly, said hub assembly having a first retaining ring mounted at a first predetermined distance from said third end towards said fourth end, without reaching said fourth end, and a second retaining ring mounted at a second predetermined distance from said first retaining ring towards said fourth end, without reaching said fourth end, whereas said wheel assembly is positioned between said first and second retaining rings, said hub assembly further having a first channel mounted at a third predetermined distance from said third end towards said first retaining ring, without reaching said first retaining ring and a second channel mounted at a fourth predetermined distance from said second retaining ring towards said fourth end, without reaching said fourth end, said hub assembly including pneumatic means to inflate and deflate said air chambers;

C) first and second track assemblies, each having first and second faces, whereas each first face has a semicircular rail mounted thereon, forming an approximate circle when said semicircular rails face each other, whereas said wheel assembly rotates between said semicircular rails and said first and second track assemblies complement said first and second channels, allowing said hub to rotate upon said first and second track assemblies; and D) a support structure including hoisting means to raise and lower said underwater power generating device and anchor means to secure said support structure, said anchor means having a predetermined cooperative length and attached to the bottom of a body of water so that said anchor means stabilizes said underwater power generating device while in operation and while hoisting means is activated.

2. The underwater power generating device set forth in claim 1, wherein said pneumatic means to inflate and deflate said flexible air chambers includes valve frames with fifth and sixth ends, located between said semicircular rails, said pneumatic means further includes said hub assembly having a primary and secondary air tank, and said air chambers having primary and secondary air valves, whereas said primary air valve opens when said fifth end is biased against said semicircular rail of said first track assembly, allowing pressurized air to exit from said primary tank through said primary valve to inflate said air chamber, and where said secondary air valve opens when said sixth end is biased against said semicircular rail of said second track assembly, allowing air to escape through said secondary air valve into said secondary air tank, said secondary tank having pump means to pump air from said secondary air tank to said primary air tank.

3. The underwater power generating device set forth in claim 2, wherein said pneumatic means further includes a water seal having seventh and eighth ends with sealing means to prevent the entry of water, said sealing means includes a first container mounted at a fifth predetermined distance from said seventh end towards said eighth end without reaching said eighth end, said first container having matter within to displace water from entering said seal.

4. The underwater power generating device set forth in claim 3, wherein said outside track is a pulley.

5. The underwater power generating device set forth in claim 4, wherein said flexible air chambers are enclosed in housing means, whereas said housing means includes attachment means to fastenly secure to said spokes.

6. The underwater power generating device set forth in claim 5, wherein said pump means is electrical.

7. A plurality of apparatus constructed according to claim 6 that form a group in a body of water to supply large predetermined quantities of power.

8. The underwater power generating device set forth in claim 7, wherein said body of water is one that is sufficiently deep to operate said underwater power generating device.

9. The underwater power generating device set forth in claim 3, wherein said matter is Gallium.

* * * * *